(12) United States Patent
Valmus et al.

(10) Patent No.: US 12,147,382 B1
(45) Date of Patent: Nov. 19, 2024

(54) METHOD AND SYSTEM FOR ASSIMILATING AND MANAGING SOFTWARE ARTIFACT METADATA

(71) Applicant: The United States of America, as represented by the Secretary of the Navy, Arlington, VA (US)

(72) Inventors: William David Valmus, Rockville, MD (US); Chelsea M. Gibson, Albuquerque, NM (US); David S. Sracic, Gaithersburg, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 108 days.

(21) Appl. No.: 17/942,156

(22) Filed: Sep. 11, 2022

Related U.S. Application Data

(60) Provisional application No. 63/242,922, filed on Sep. 10, 2021.

(51) Int. Cl.
| | |
|---|---|
| *G06F 16/00* | (2019.01) |
| *G06F 8/75* | (2018.01) |
| *G06F 9/445* | (2018.01) |
| *G06F 9/455* | (2018.01) |
| *G06F 11/34* | (2006.01) |
| *G06F 16/31* | (2019.01) |
| *G06N 20/00* | (2019.01) |
| *G06Q 30/02* | (2023.01) |

(52) U.S. Cl.
CPC ............... *G06F 16/00* (2019.01); *G06F 8/75* (2013.01); *G06F 11/3466* (2013.01)

(58) Field of Classification Search
CPC ........ G06F 16/00; G06F 8/75; G06F 11/3466; G06F 16/9535; G06F 16/3325; G06F 16/316; G06F 16/36; G06F 16/288; G06F 40/10; G06N 20/00; G06Q 30/016; H04L 63/1466; H04L 43/04; H04L 67/535; H04L 67/53; H04L 63/1425
See application file for complete search history.

(56) References Cited

U.S. PATENT DOCUMENTS

| | | |
|---|---|---|
| 10,691,514 B2 | 6/2020 | McClury et al. |
| 10,713,664 B1 | 7/2020 | Alagappan et al. |
| 10,795,662 B2 | 10/2020 | Gadgil et al. |
| 11,010,191 B1 | 5/2021 | Hornbeck |
| 11,023,301 B1 | 6/2021 | Hornbeck |
| 11,036,483 B2 | 6/2021 | Veljanoski et al. |

(Continued)

*Primary Examiner* — Thuy Dao
(74) *Attorney, Agent, or Firm* — Howard Kaiser

(57) ABSTRACT

Exemplary practice of the present invention assimilates information from various commercial software scanning tools. Distinctive characteristics pertaining to the construction and constitution of the different software items are gathered and tracked. A practitioner is thus afforded the capability of, for instance, generating customized dashboards to present the assimilated information. The data obtained are considered to describe different data types and different data formats. Among the inventive features is a normalization of every data format to a standard data format as part of the analytical methodology. The resultant universalization of the database can be facilitative with respect to a variety of ways in which the database may be utilized.

3 Claims, 16 Drawing Sheets

(56) References Cited

U.S. PATENT DOCUMENTS

| | | |
|---|---|---|
| 11,061,669 B2 | 7/2021 | Mittell et al. |
| 11,093,227 B1 | 8/2021 | Shteyman et al. |
| 11,282,092 B2 * | 3/2022 | Ratnaswamy ..... G06Q 30/0201 |
| 11,361,007 B2 * | 6/2022 | Dimassimo ......... G06F 16/3325 |
| 2021/0075814 A1 | 3/2021 | Bulut et al. |
| 2021/0174280 A1 | 6/2021 | Ratnapuri |
| 2021/0352142 A1 * | 11/2021 | Jayaram ................. G06Q 20/26 |

\* cited by examiner

Overview
This is a brief overview of the components that make up the ArtifactDNA System.

ArtifactDNA System:
- artifactDNA.pl — ArtifactDNA System application
- artifactDNA.pm* — Main codebase for ArtifactDNA system
- artifactDNA-manager.pl* — Command line interface management console
- discoveryService.pl — Scans new artifacts and adds documents available for scanning and configuration
- reporter.pl* — Reporting engine
- sequencer.pl — Program running in background that controls the tool queue
- parser.pl — Document parsing tool.

Markup Languages:
- ArtifactDNAML — Markup language used to define imports, exports and reports. DNAML file extension

Markup Tools:
- DNADesigner — Tool used to create and test ArtifactDNAML documents

Pipeline Tools:
- artifactScan.pl* — Pipeline scan request tool
- init.pl* — Pipeline initialization tool
- post.pl* — Pipeline clean-up tool. Will launch discoveryService.pl if this is a new artifact

UI Tools:
- Dashboard — Quick look at the overall project, artifact status and pipeline health
- Outlier Dashboard — Used to get a quick view on all issues detected with artifacts
- Artifact Manager — Allows users to fine tune managed data, documents, and tools
- Mitigation Manager — Compliance and Vulnerabilities cyber management
- Package Manager — Used to manage/track application packages
- CVE Manager — Used to manage Compliance.
- Compliance Manager — Used to manage CVEs and CVE data sources.
- STIG Manager — Used to manage/track STIGs
- Delivery Manager — Used to select artifacts and data reports used to support deliveries
- Programmer Dashboard — Used by programmers to manage the artifact requests
- DNADesigner — Create and test ArtifactDNAML documents
- UDS Data Manager — Used to manage data storage, imports, and exports
- User Admins — User management
- Tools manager — Tool manager used to configure external tools

FIG. 7

Overview
This is a list of the current state of all features available within the prototype ArtifactDNA System.

Import plugin tools:
Released:
- Twistlock/PrismaCloud CLI Scan (JSON)
  o Docker Image Scans
    * Vulnerabilities
    * Compliance
    * Packages
    * Docker layer inspection
    * Network information Alpha:
- Anchore Grype (JSON)
  o Docker image or Repository Scans
    * Vulnerabilities
- Anchore SYFT (JSON)
  o Docker Image Scans
    * Software Bill of Materials (SBOM)
- Bitbucket/Git (Git Logs)
  o Repository
    * Contributors
    * User
    * Pull Request
    * Date
    * Merger
    * Approvers
- OWASP Dependency-Check Scan (XML)
  o Software Composition Analysis
    * Vulnerabilities
    * Dependencies
- SonaType IQ Server (JSON)
  o Binary Scanner
    * Vulnerabilities
    * Compliance
    * Packages
    * License information Planned:
- Anchore Engine (JSON)
- NIST NVD Vulnerabilities Data
  o Vulnerability data used for reporting CVE details.
- OWASP Dependency-Track Scan (XML) (Will only use if it provides more/different data than OWASP Dependency-Check)
  o Software Composition Analysis
    * Vulnerabilities
    * Compliance
    * Dependencies
- Scala Scapegoat (XML)
  o Scala Static Code Analysis
    * lint
- Scoverage (XML)
  o Statement and Branch coverage
  o Unit tests
- SonarQube
- OSCAL Export plugin tools:
Released:

Alpha:
- Plan of Actions and Milestones (POA&M) (CSV)
- Request for Information (RFI) (CSV)
- Version Delivery Document (VDD) (CSV)
- Version Delivery Document (VDD) (JSON)
- Free and Open-Source Software (FOSS) (CSV)

Planned:
- FOSS
- Change Logs
- STIG Checklists
- Chain of Custody Documents
- Document of Authenticity

FIG. 8

Overview

This is a list of the current state of all features available within the prototype ArtifactDNA System.

Import plugin tools:

Released:
- Twistlock/PrismaCloud CLI Scan (JSON)
  - Docker Image Scans
    - Vulnerabilities
    - Compliance
    - Packages
    - Docker layer inspection
    - Network information Alpha:
- Anchore Grype (JSON)
  - Docker Image or Repository Scans
    - Vulnerabilities
- Anchore SYFT (JSON)
  - Docker Image Scans
    - Software Bill of Materials (SBOM)
- Bitbucket/Git (Git Logs)
  - Repository
    - Contributors
    - User
    - Pull Request
    - Date
    - Merger
    - Approvers
- OWASP Dependency-Check Scan (XML)
  - Software Composition Analysis
    - Vulnerabilities
    - Dependencies
- SonaType IQ Server (JSON)
  - Binary Scanner
    - Vulnerabilities
    - Compliance
    - Packages
    - License information

FIG. 9 planned:
* Anchore Engine (JSON)
* NIST NVD Vulnerabilities Data
  * vulnerability data used for reporting CVE details.
* OWASP Dependency-Track Scan (XML) (Will only use if it provides more/different data than OWASP Dependency-Check)
  * Software Composition Analysis
    * Vulnerabilities
    * Compliance
    * Dependencies
* Scala Scapegoat (XML)
  * Scala Static Code Analysis
    * lint
* Scoverage (XML)
  * Statement and Branch coverage
  * Unit tests
* SonarQube
* OSCAL Export plugin tools:
released:

Alpha:
* Plan of Actions and Milestones (POA&M) (CSV)
* Request for Information (RFI) (CSV)
* Version Delivery Document (VDD) (CSV)
* Version Delivery Document (VDD) (JSON)
* Free and Open-Source Software (FOSS) (CSV)

planned:
* FOSS
* Change Logs
* STIG checklists
* Chain of Custody Documents
* Document of Authenticity

FIG. 10

METHOD AND SYSTEM FOR ASSIMILATING AND MANAGING SOFTWARE ARTIFACT METADATA

CROSS-REFERENCE TO RELATED APPLICATIONS

This patent application claims the benefit of U.S. provisional patent application No. 63/242,922, filed 10 Sep. 2021, hereby incorporated herein by reference, entitled "Method and System for Assimilating and Managing Software Artifact Metadata," named inventors William D. Valmus et al.

STATEMENT OF GOVERNMENT INTEREST

The inventorship of the invention described herein includes at least one person who invented the invention in performance of the person's official duties as an employee of the Department of the Navy. The invention may be manufactured, used, and licensed by or for the Government of the United States of America for governmental purposes without payment of any royalties thereon or therefor. The Government of the United States of America has ownership rights in the invention.

BACKGROUND OF THE INVENTION

Increasingly, modern software is being built in a "DevSecOps pipeline," which is a suite of development tools that can be chained together to allow software to be built in a kind of "assembly line" fashion. A DevSecOps pipeline provides for the building of software in a manner akin to the building of a widget on a factory floor, via an assembly line process that is repeatable, inspectable, and automated. Government agencies have been investigating ways to leverage the benefits provided through the use of DevSecOps pipelines, while also attempting to alleviate the many burdens put on developers and cybersecurity engineers, such as involving an existing risk management framework (RMF) to obtain an authorization to operate (ATO).

In software development, the term "pipeline" (synonymously, "data pipeline") is used to describe a serial connection of different processing elements, wherein a particular element's output is the succeeding element's input. A DevSecOps (Development+Security+Operation) pipeline for software is analogous to an assembly line in a factory (such as for manufacture of cars or widgets), wherein different tasks are sequentially performed by different workstations. Among the benefits of a pipelining approach is an increase of a system's throughput.

DevSecOps pipelines are disclosed in the literature and are in use. One of the biggest challenges with DevSecOps pipelines today is that if one of the critical tools in that assembly line is changed out, there is a substantial cost and productivity impact. Many vendors that build those critical tools seek to make their tools the one and only standard. For instance, a tool vendor may encourage a prospective buyer to use and learn the vendor's tool and to accept the tool's format for reports for ATOs. Under typical circumstance, the tools of a typical pipeline do not work together; in particular, they are incompatible in that they each use their own formats, vocabulary, and user interfaces.

In existing practice, there is no single tool that meets all needs or is good at all functions and operations. Most pipelines use a few or several (e.g., three to five) different tools to scan for different items at different points in the assembly line. These conventional pipelines are typically beset with concerns including those in the following respects: dependency management (synonymously, a "software supply chain," e.g., whether a given software module also includes other software modules that might present risk); static code analysis (e.g., whether a given source code performs damaging acts, such as introduce exploitable memory leaks); security assessment (e.g., whether a given application or library includes any known vulnerabilities"); compliance checking (e.g., whether a given module is configured to meet guidelines); etc. These tools all include their own dashboards, reporting in their own format, in the absence of any correlation to what any of the other tools might report or how.

SUMMARY OF THE INVENTION

The present invention, as exemplarily embodied, represents a unique methodology for assimilating and presenting information deriving from a variety of sources. Inventive practice can be propitious, for example, in order to use best-of-breed commercial, open source, and government tools to do various scans, and have their different outputs managed consistently and aggregated into useful reports. Exemplary inventive software assimilates information from different commercial software scanning tools, gathering and tracking unique characteristics about the makeup of the software, and allowing a user to generate customized dashboards to present the assimilated information.

In accordance with exemplary practice of the present invention, a computer-implemented method for performing data analysis includes collecting data and analyzing the collected data. The analyzing of the collected data includes characterizing the collected data, normalizing every data format, and storing the collected data in accordance with the normalization of every data format. The collected data is characterized in terms of a plurality of data types and a plurality of data formats. Each data type has a data format associated therewith. Every data format is normalized to a standard data format. The collected data is stored in accordance with the normalization of every data format to the standard data format. According to frequent inventive practice, the storing of the collected data in accordance with the normalization includes using a data definition directory for effecting storage by data type. The storage is in a category selected from the group consisting of specialized data storage and universal data storage. The specialized data storage implements specialized tables. Each specialized table corresponds to a data type. The universal data storage does not implement specialized tables.

The present inventor calls his inventive software system the "ArtifactDNA" System. As exemplarily embodied, the present invention is a system or method for managing heterogeneous software artifact metadata in a pipeline such as a DevSecOps pipeline. The present inventor has fashioned the name "ArtifactDNA" to refer to exemplary practice of his invention. The United States Navy has applied (Ser. No. 90/599,045; filing date 24 Mar. 2021), in the United States Patent and Trademark Office (USPTO), for trademark protection of the word mark "ARTIFACTDNA."

The term "artifact," as conventionally used in computer technology, refers to any type of software development by-product produced during the software development lifecycle. Artifacts are any related object that can be scanned or tracked, including but not limited to configuration files, software source code, compiled libraries, binaries, container images, virtual machines, or intermediate products. An artifact is any type of source code by-product produced during the development of software. Artifacts are objects that can be scanned or tracked—e.g., a vulnerability scan, repository information, etc. An exemplary inventive ArtifactDNA System provides a practitioner the ability to use aggregated data to provide reporting ATO deliverables, cybersecurity thresholds, and other desired delivery products.

An ArtifactDNA System, as exemplarily embodied, assimilates information from any software scanning tools, considering a variety of concerns including chain of custody, bill of materials, cybersecurity, code quality, vulnerability information, and pedigree and provenance of past changes for any given software artifact as the software is developed. Essentially, it gathers and tracks the unique characteristics that make up the software-all the information about how it's put together, and how it came to be, much like DNA does for living organisms. It allows a user to generate customized dashboards to present the information in tailored ways to different consumers, such as a cybersecurity professional, a software developer, a program manager, or a compliance officer.

An ArtifactDNA System, as exemplarily embodied, provides chain of custody, pedigree, and provenance for the lifecycle of the given artifact by tracking the needed information at any given stage of the software lifecycle or development pipeline. This provides a timeline to ensure the integrity and quality throughout the lifetime of the scanned system. The present invention may be embodied for instance as a method, an apparatus, or a computer program product (e.g., downloadable software or online non-downloadable software). Exemplary inventive practice assimilates information from different commercial software scanning tools, gathering and tracking unique characteristics about the makeup of the software, and allowing a user to generate customized dashboards to present the assimilated information. The invention of the ArtifactDNA System was inspired in part by inventor William D. Valmus's realization that incorporating a database into a pipeline would be vastly beneficial to the pipeline.

An exemplary embodiment of an ArtifactDNA system is an artifact tracking tool used to aggregate multiple data sources into a single manageable system. The inventive system provides interfaces and markup language tools to create plugins to allow the system to import, export, and report collected data. In inventive context, a "plugin" (alternative spelling "plug-in") is an import, export, or reporting tool written using the ArtifactDNA System's REST API or command line (CLI) tools. Plugins can be written in any language that supports REST API or CLI access. Notably, the inventive system is usually not embodied as a scanning tool, or as an eMASS-only tool. According to exemplary inventive practice, the ArtifactDNA system collects and aggregates data provided by other tools. There are many tools that the present invention's ArtifactDNA System can use to provide data for tracking and/or reporting. Additional plugins can be added using the inventive system's ArtifactDNAML mark-up language or the inventive system's integration tools.

BRIEF DESCRIPTION OF THE DRAWINGS

The present invention will now be described, by way of example, with reference to the accompanying drawings, wherein:

FIG. 1 shows the overall conventional pipeline. The conventional pipeline is not enhanced with the present invention's ArtifactDNA.

FIG. 4 shows the overall inventive pipeline. As distinguished from the conventional pipeline shown in FIG. 1, the inventive pipeline shown in FIG. 4 is enhanced with the present invention's ArtifactDNA.

FIG. 7 is a table describing, by way of example, components of an ArtifactDNA System in accordance with the present invention.

FIG. 8 is a table describing, by way of example, features of an ArtifactDNA System in accordance with the present invention. FIG. 8 shows the overall table.

FIGS. 9 and 10 each show a partial and enlarged view (upper and lower portions, respectively) of the table shown in FIG. 8.

FIG. 16 shows a normalization of data formatting for facilitating, for instance, storage, importing, and exporting of data.

DESCRIPTION OF EXEMPLARY
EMBODIMENTS OF THE INVENTION

Figure 1:
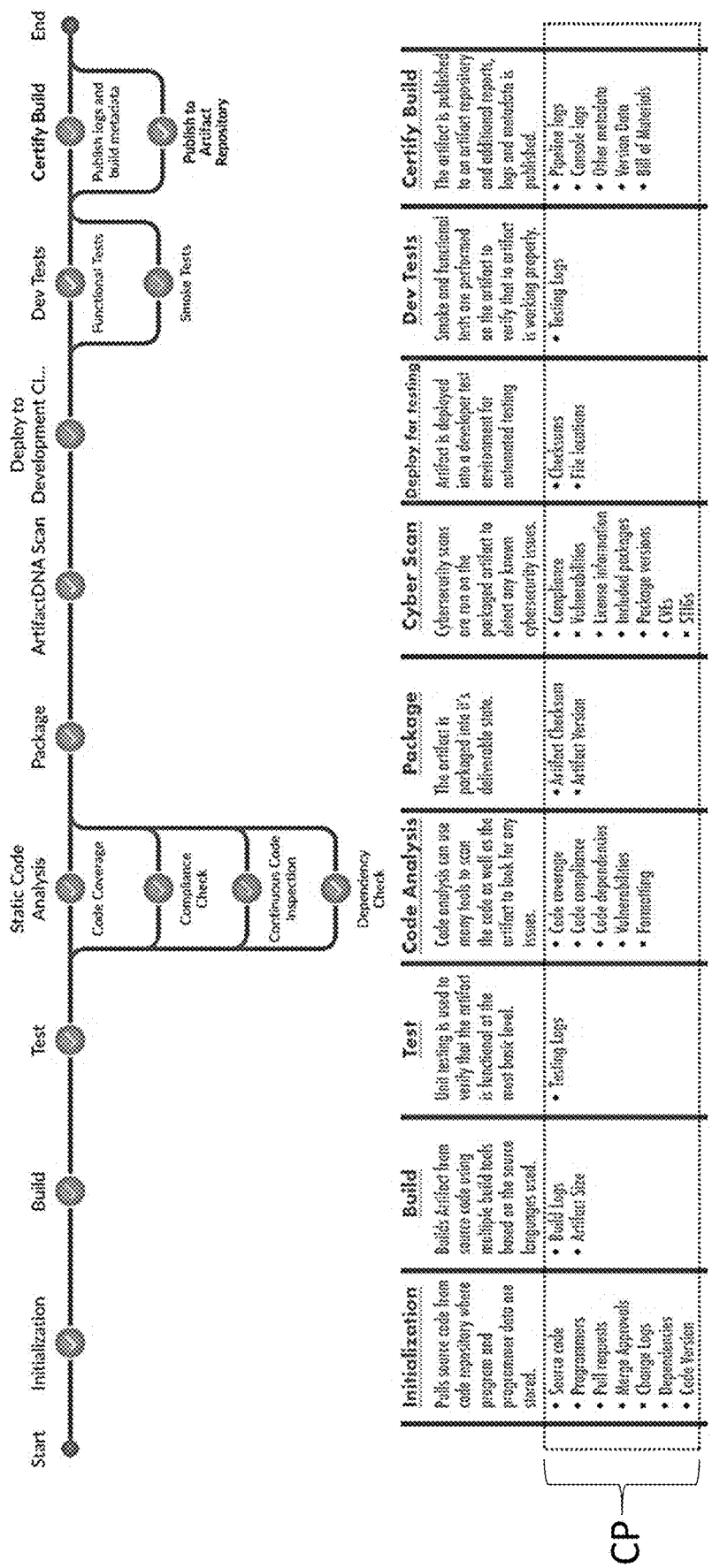
FIG. 1 is a diagram of an example of a conventional data pipeline.
Figure 2:
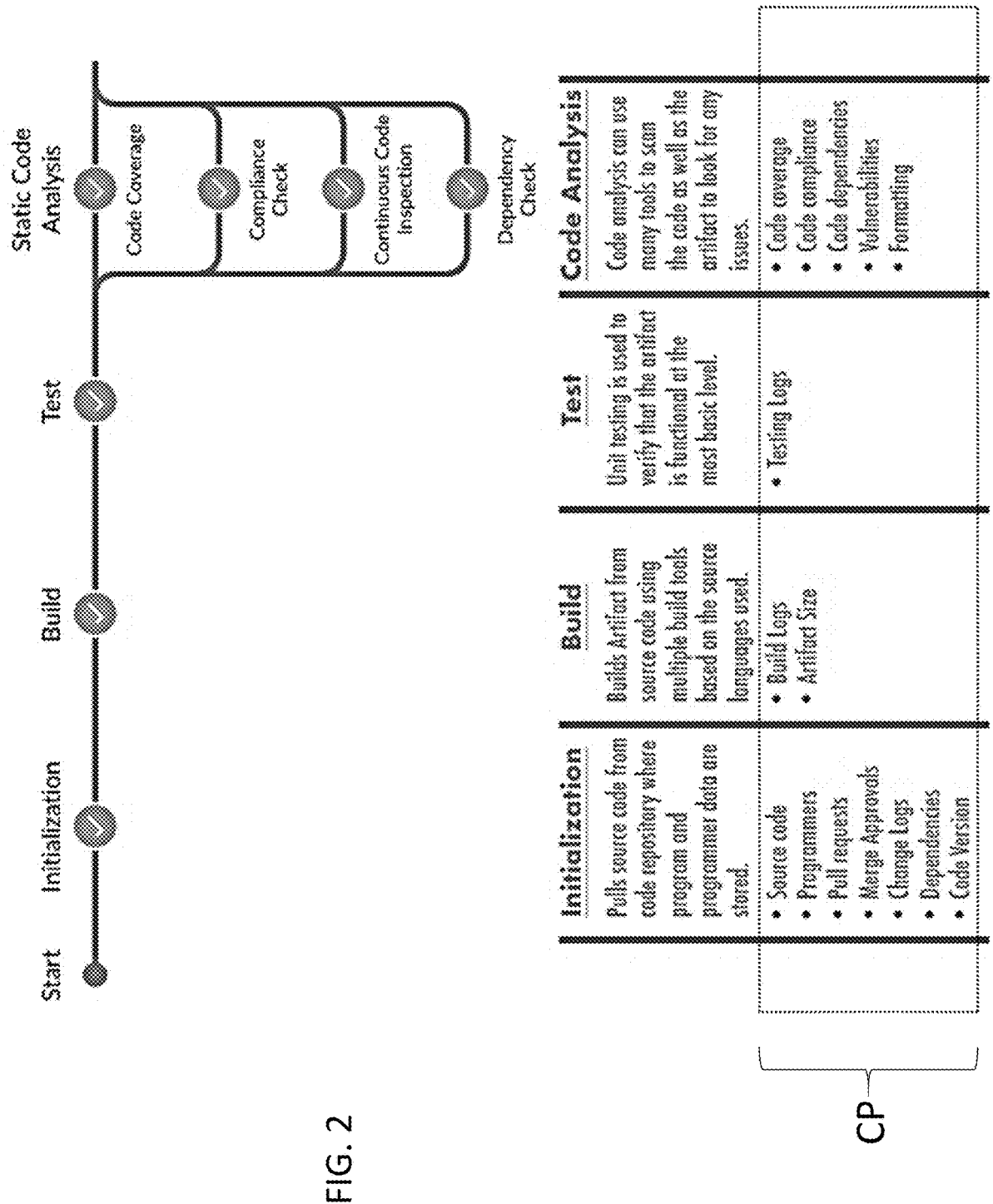
FIGS. 2 and 3 each show a partial and enlarged view (lefthand and righthand portions, respectively) of the conventional pipeline shown in FIG. 1.
Figure 3:
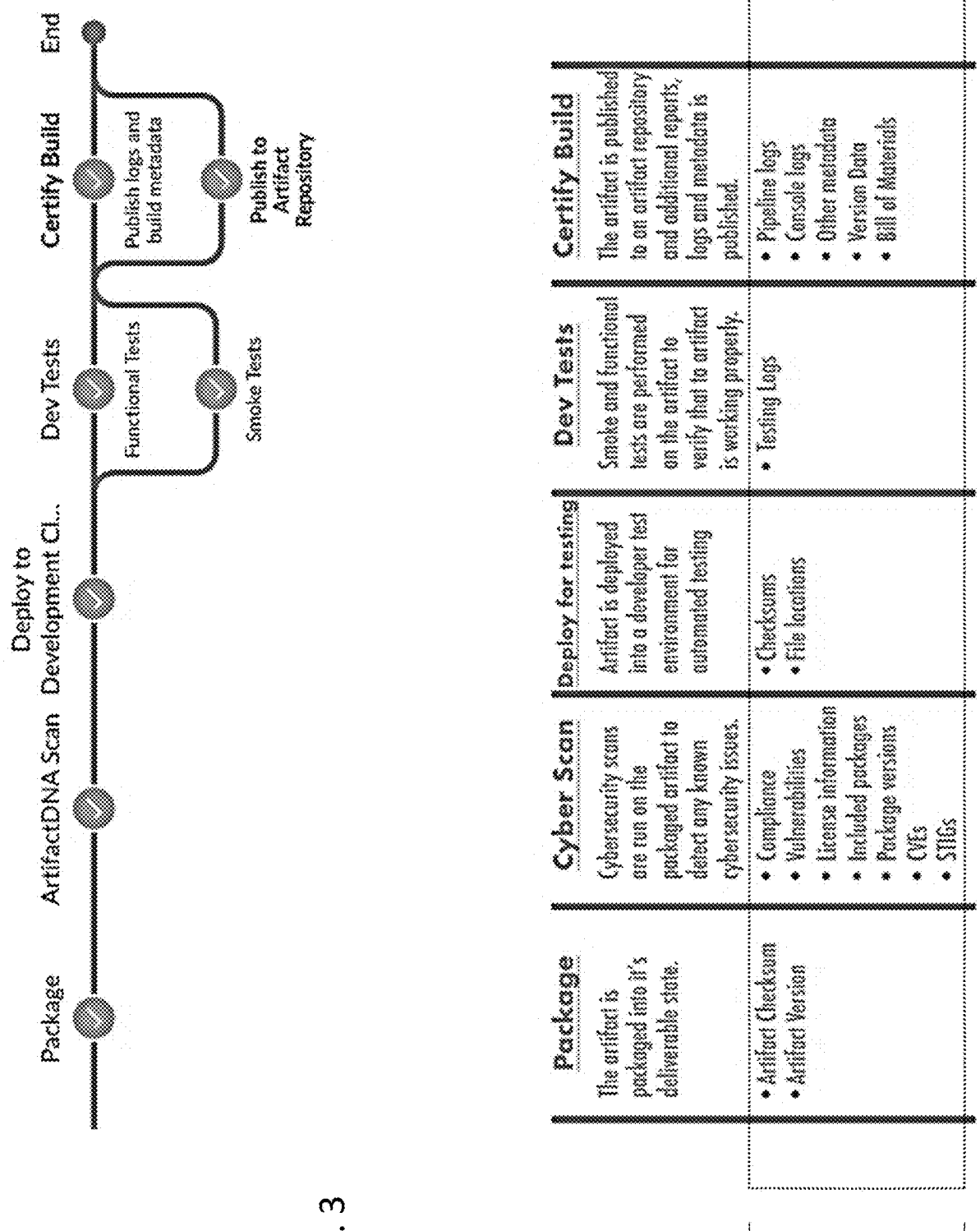
Figure 4:
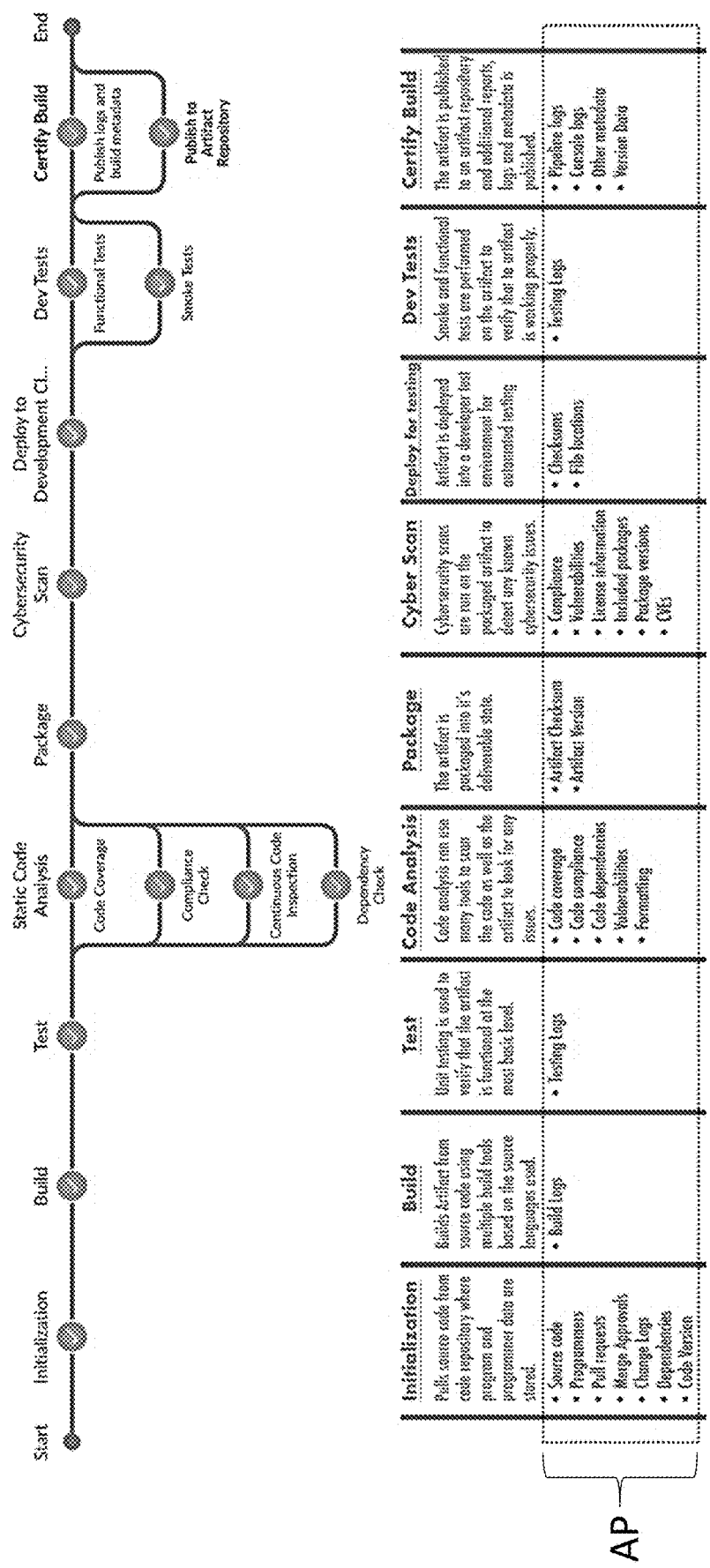
FIG. 4 is a diagram of an example of an invention data pipeline.
Figure 5:
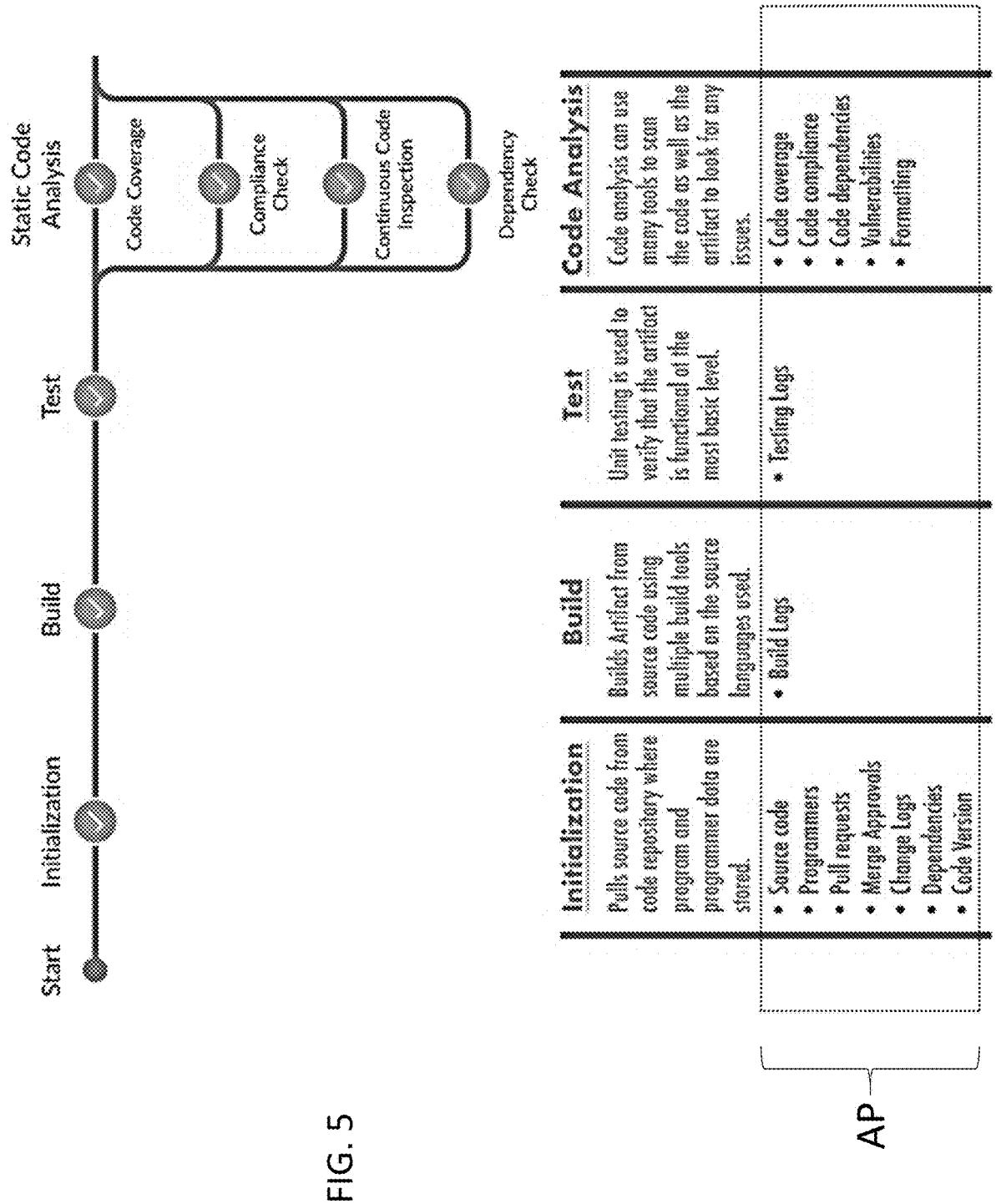
FIGS. 5 and 6 each show a partial and enlarged view (lefthand and righthand portions, respectively) of the inventive pipeline shown in FIG. 4.
Figure 6:
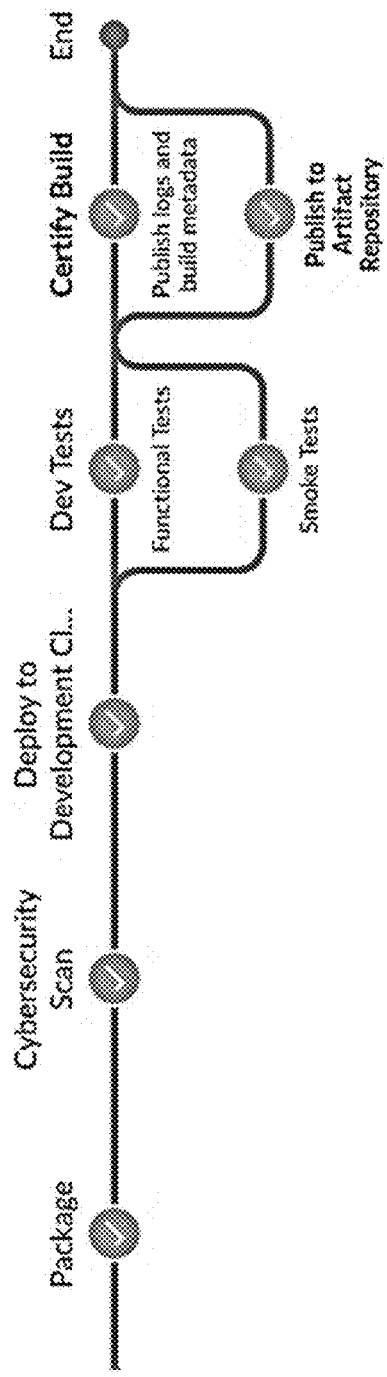

FIG. 1 and FIG. 4 show two contrasting data pipeline models. FIG. 4 illustrates an example of a pipeline model that is associated with an embodiment of an inventive ArtifactDNA System. That is, the data pipeline shown in FIG. 4 incorporates inventive practice of an inventive ArtifactDNA System. FIG. 1 illustrates an example of a pipeline model that is not associated with an embodiment of an inventive ArtifactDNA System. That is, the data pipeline shown in FIG. 1 does not incorporate inventive practice of an inventive ArtifactDNA System.

FIG. 1 and FIG. 4 each contain data logs, data files, metadata, etc. These kinds of data are indicated by an encompassing box in FIG. 1 as "CP" (conventional pipeline) data. In parallel fashion, these kinds of data are indicated by an encompassing box in FIG. 4 as "AP" (ArtifactDNA pipeline) data. As distinguished from the ArtifactDNA pipeline shown in FIG. 4, the data logs, data files, and metadata are not automatically processed by the conventionally practiced pipeline shown in FIG. 1. However, same or similar logs, files, and metadata are automatically processed by the inventively practiced pipeline shown in FIG. 4. It should be pointed out that the AP data that are shown to be processed automatically in accordance with the ArtifactDNA pipeline shown in FIG. 4 are not inclusive of all of the data that are not processed automatically in accordance with the conventional pipeline shown in FIG. 1. Rather, the AP data shown in FIG. 4 constitute a mere fraction of all of the data that needs to be processed by hand or analyzed for each run in accordance with the pipeline shown in FIG. 1.

According to exemplary practice of the present invention, the present inventor's ArtifactDNA System is a software system that is used to manage metadata about software artifacts that are built by a DevSecOps pipeline. The artifacts are stored as heterogeneous bits of information in different formats from different scanning tools that can be managed together, queried together, and depicted in unique, customized views for different users. An exemplary inventive ArtifactDNA System is not a scanning tool. Rather, an inventive ArtifactDNA System collects and aggregates data provided by other things such as various forms of scanning tools.

Software development is typically a very iterative process. FIG. 1 shows an example of a generic development pipeline, which depending on the situation may possibly range from a few to many hundreds of iterations between software versions. Each iteration or run of the pipeline can generate an abundance of logs, but these logs are only data. Data alone do not ensure that the business needs are being met. Even a failed run creates data that will need to be tracked and processed. The business needs can be quite complex due to compliance requirements, regulations, the vast array of data file types, and quality needs of complex systems. Each data log and file produced during a run would need specialized knowledge to interpret and use. A growing number of conventional pipeline tools have management tools that can be used to manage parts of the produced data. Most of these tools focus on one type of user (Programmers, Cyber Security, DevSecOps). This can create silos and lead to information not getting to the users that need it.

The inventive ArtifactDNA System, as exemplarily embodied, is an extremely robust and flexible artifact tracking tool that may be used to aggregate multiple data sources into a single manageable system. Exemplary inventive practice provides a RESTful API, used to create plug-ins to allow the system to import, export, and report collected data. An exemplary embodiment of an inventive ArtifactDNA System is also a mechanism running alongside a CI/CD Pipeline that supports integration of cybersecurity throughout the engineering development life cycle, easing the burden for cybersecurity professionals to be experts on every aspect of a system and their need to review every change. In contradistinction to conventional practice, the ArtifactDNA System's pipeline tools can be used to enable the ArtifactDNA System to collect and aggregate all the data logs and files produced, and to produce reports and data files that meet the business needs and get the information to the users that need it so that they can make the most informed decisions. The present invention's ArtifactDNA System can also provide back to the pipeline, allowing for better pipeline control and management.

Inventive practice may be especially propitious for large organizations such as federal or state government agencies. For instance, tool vendors may tend to promote primary or exclusive use of their tool, to be learned by the government agency and accepted as the format of their tools for reports for authorizations to operate (ATOs). In the absence of the present invention's ArtifactDNA System, the government agency would have to train developers, managers, and cyber authorities to use and understand many different software lifecycle development tools and their gaps and seams, and continually retrain these personnel as the tools evolve, and forces developers to develop for compliance in order to use the required scan tools. The inventive ArtifactDNA System, as exemplarily embodied, facilitates management of these various tools, abstracts away their differences, and makes it easy or easier to present data from those tools in formats that are currently understood by the government agency.

Inventive practice may be greatly beneficial to a government agency with regard to authorizations to operate specific forms and instances of computer technology. Typically, every new computer system that is developed or considered for operation on a government agency information network must go through a process (e.g., designated a "risk management process," or "RPM") in order to be accorded an "authorization to operate" ("ATO"). An ATO frequently requires an excessive amount of paperwork in order to depict the amount of risk associated with the system that is contemplated for being connected. For instance, one particular document that is required in a Risk Management Process is denoted a "Plan of Actions and Milestones" (POA&M). A POA&M on a moderately sized system can take one person hours to manually create; to date, a POA&M has been a manual process. However, with implementation of an inventive ArtifactDNA System, the required data is ingested from multiple scanning tools for the POA&M with every build, thereby automatically creating or recreating, within a matter of seconds, a POA&M in a format with which an Authorizing Official is familiar. FIG. 1 shows a redacted snippet of an example of a POA&M generated by an inventive ArtifactDNA System. FIGS. 1A, 1B, 1C and 1D are partial and enlarged renditions of FIG. 1.

The present inventor, with the assistance of colleagues, is developing a prototype of his invention. The U.S. Navy has begun private testing of this inventive prototype in its early stages of development. Outputs from the following scanning tools and are currently being ingested into the Navy's prototype ArtifactDNA System:
  Twistlock/PrismaCloud CLI Scan (JSON)
  Anchore Grype (JSON)
  Anchore SYFT (JSON)
  Bitbucket/Git (Git Logs)
  OWASP Dependency-Check Scan (XML)
  SonaType IQ Server (JSON)

Figure 11:
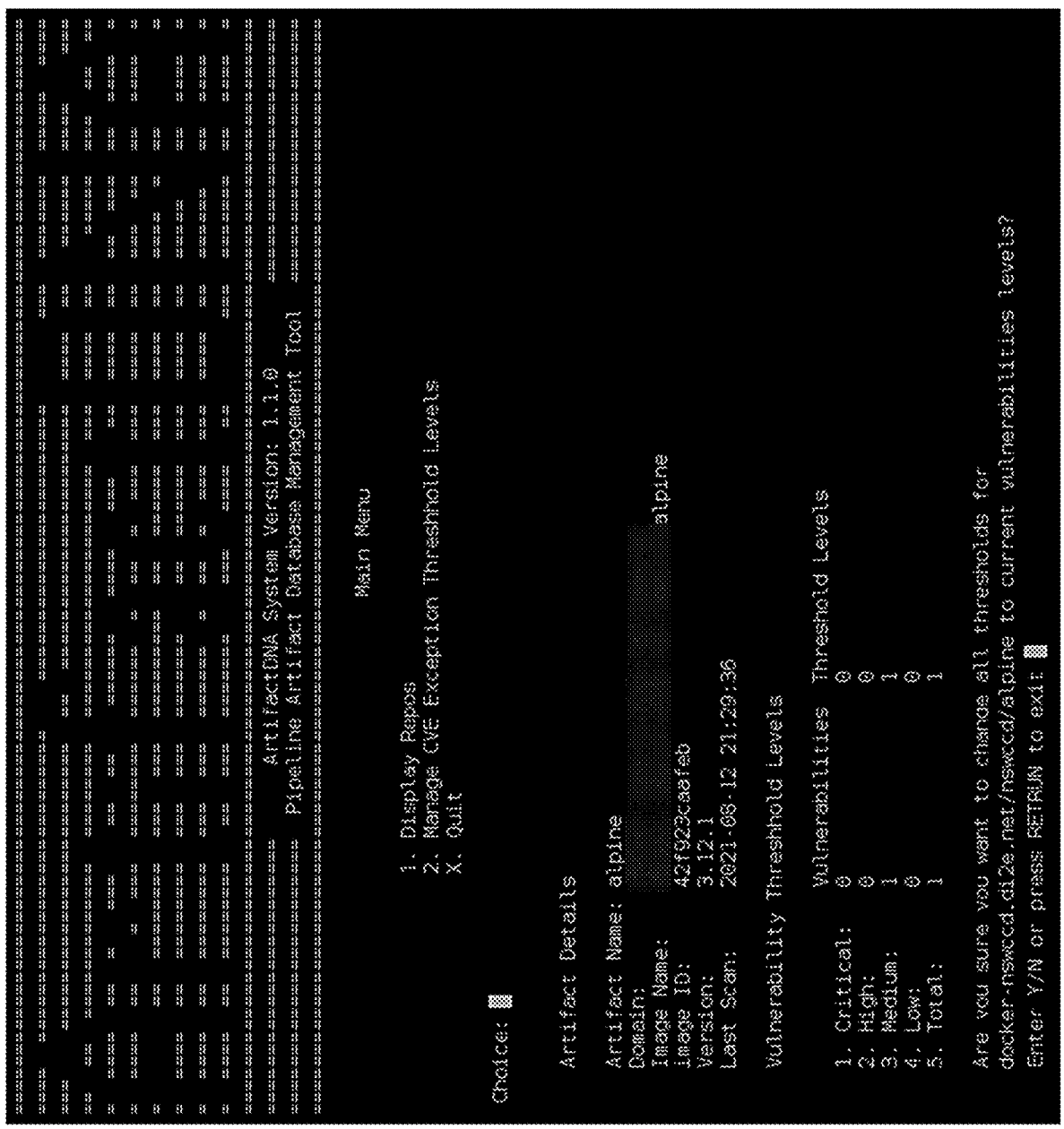
FIG. 11 is an example of a screenshot of a command line interface in accordance with the present invention.
Figure 12:
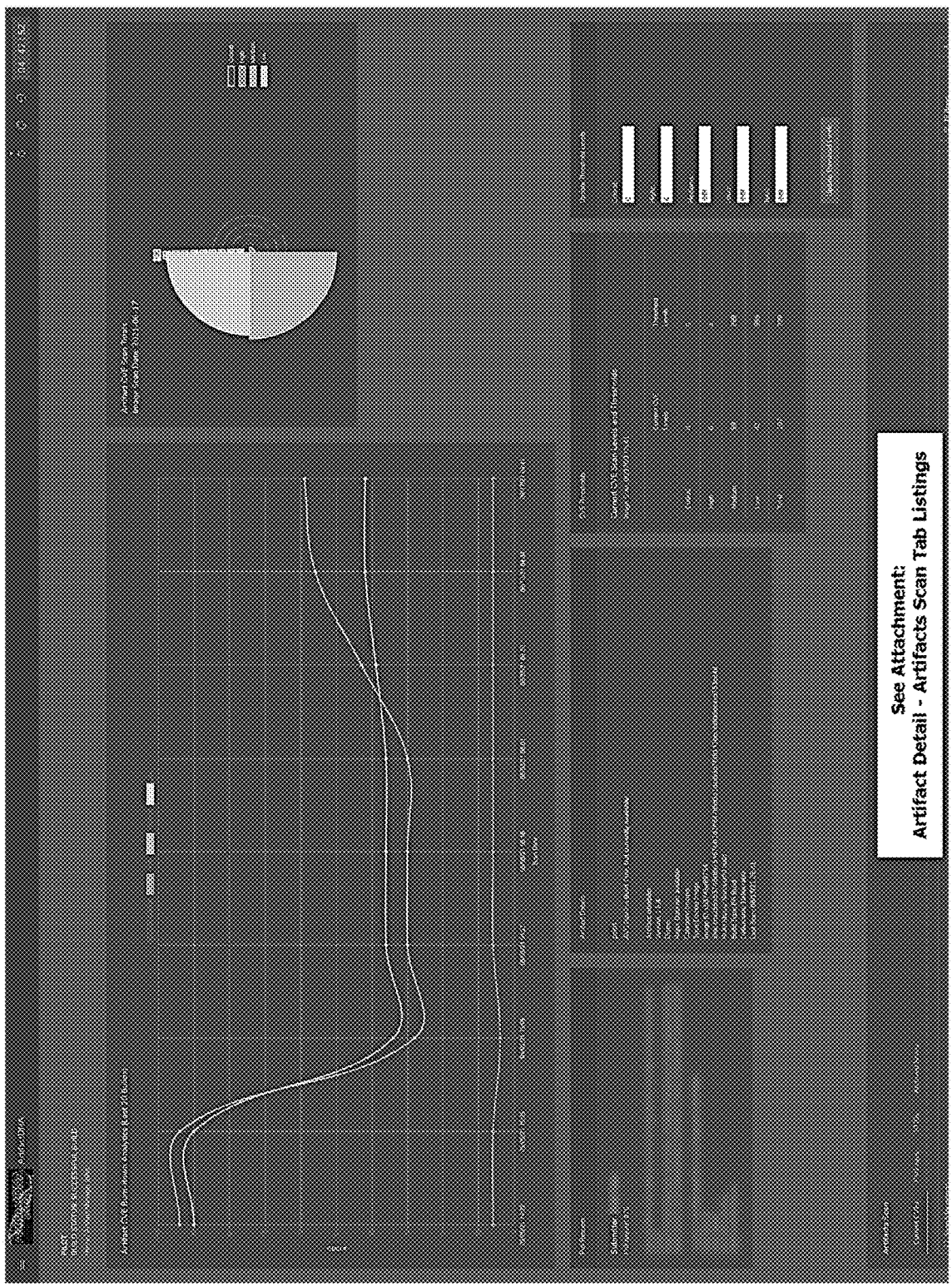
FIG. 12 is an example of a screenshot of scan tab listings in accordance with the present invention.
Figure 13:
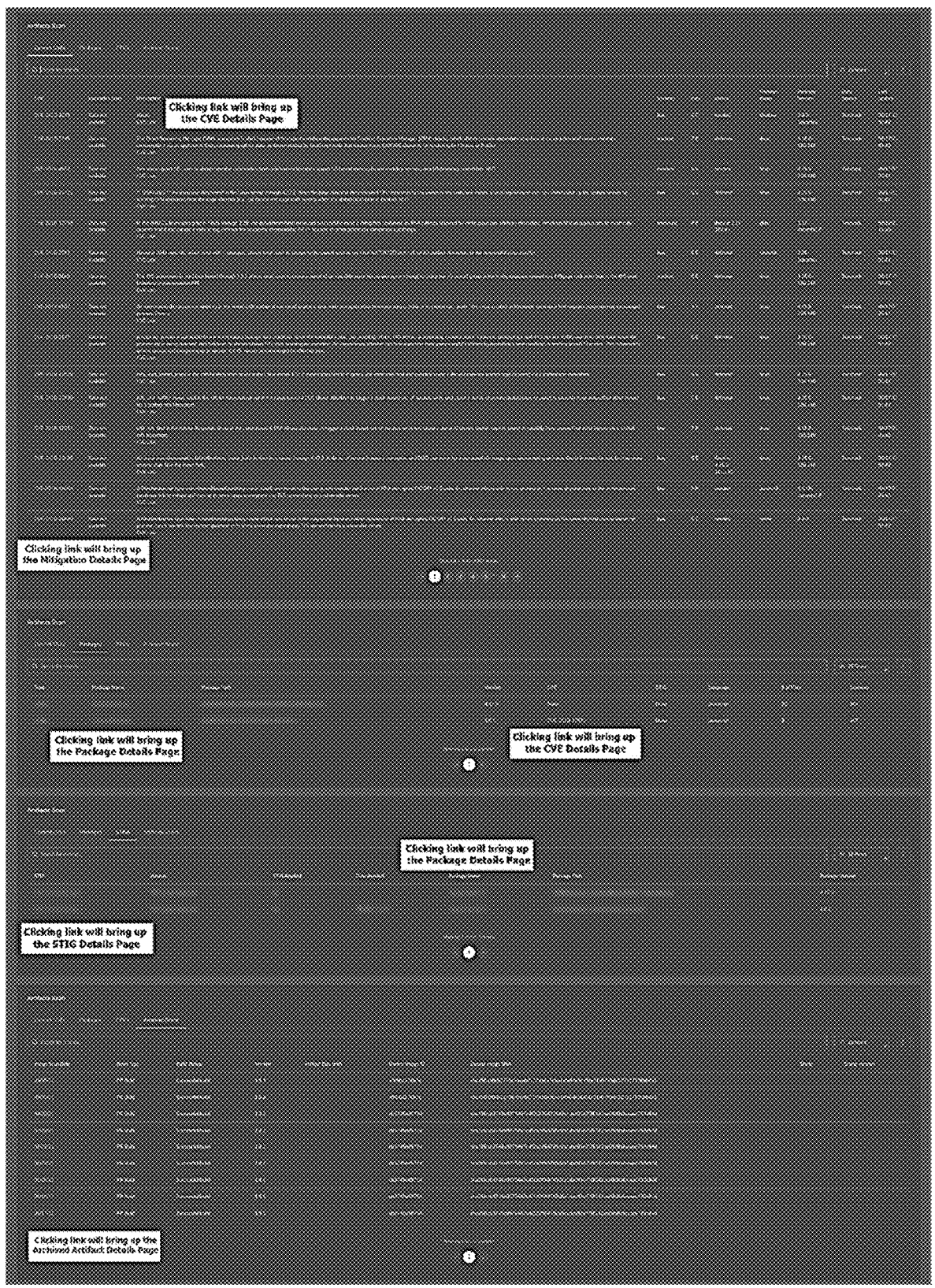
FIG. 13 is an example of a screenshot of an artifacts scan in accordance with the present invention.
Figure 14:
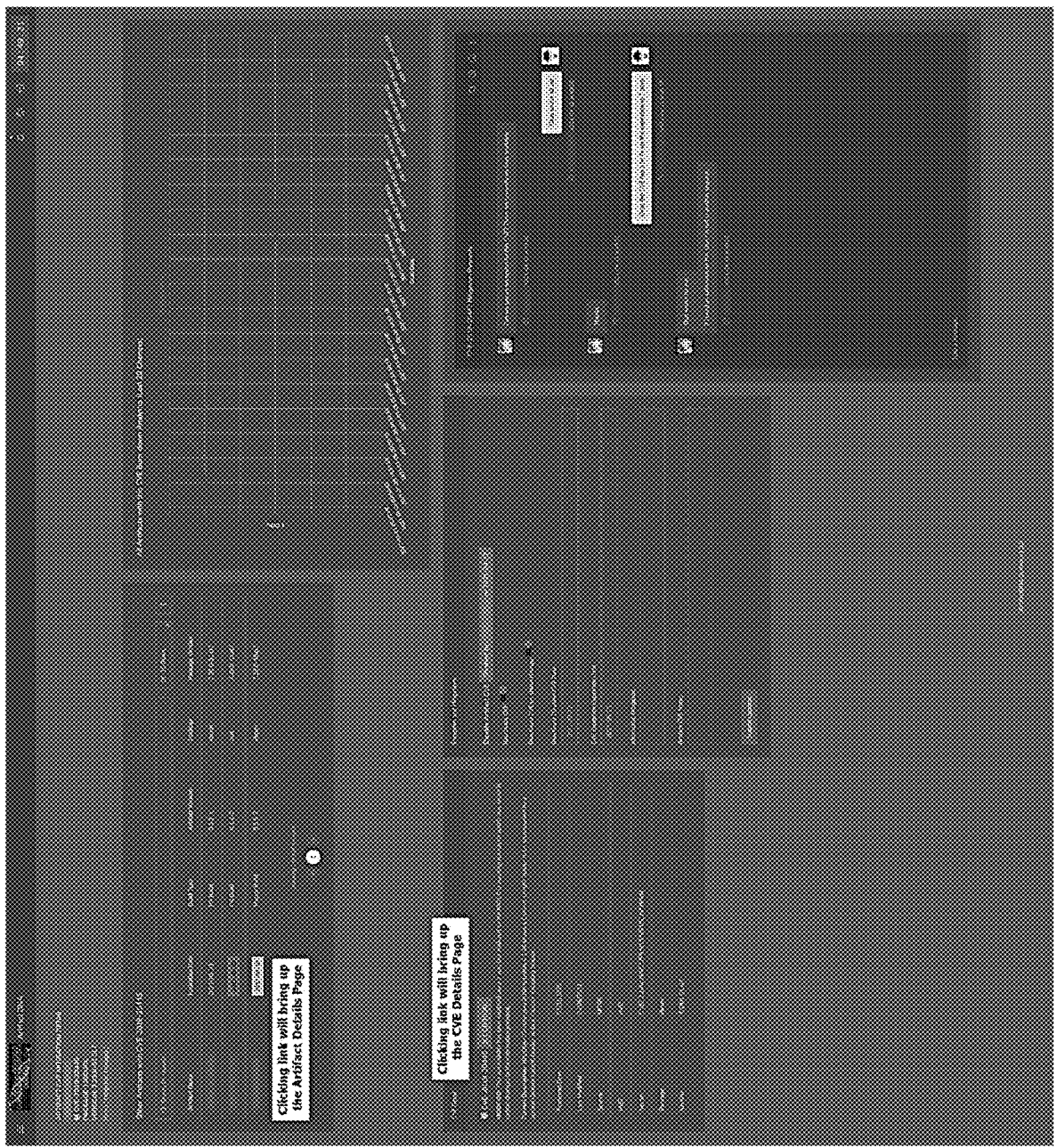
FIG. 14 is an example of a screenshot of CVE mitigation detail in accordance with the present invention.
Figure 15:
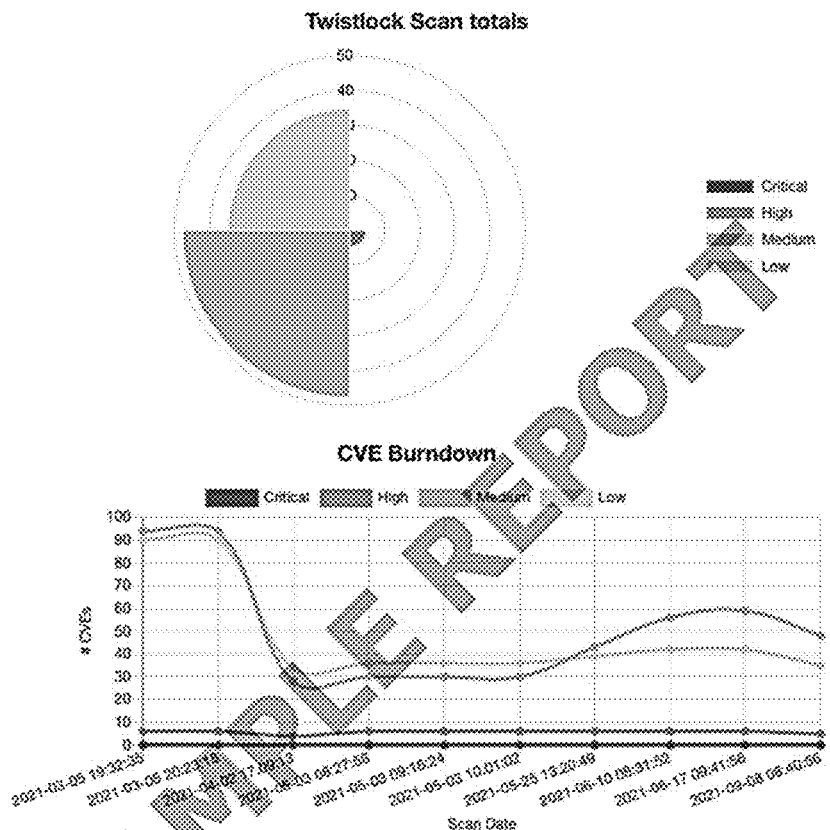
FIG. 15 is an example of a cybersecurity scan report generated in accordance with the present invention.

The United States Navy plans to integrate, in the near term, the following tools into the Navy's prototype ArtifactDNA System:
  Anchore Engine
  NIST NVD Vulnerabilities Data Vulnerability (data used for reporting CVE details)
  OWASP Dependency-Track Scan (XML)
  Software Composition Analysis
    Vulnerabilities
    Compliance
    Dependencies
  Scala Scapegoat (XML)
    Scala Static Code Analysis
    lint
  Scoverage (XML)
    Statement and Branch coverage An exemplary inventive ArtifactDNA System stores all information related to every repository, image, PR, scans, etc. FIG. 11 shows the CLI interface. FIGS. 12 through 14 show portions of the WEB based UI (User Interface). Note that in some of the drawings contained herein, certain information has been redacted. Exemplary practice of an inventive system manages all cybersecurity thresholds and exception requests, hosts all RMF artifacts, and provides a complete chain of custody for every image. The prototype inventive ArtifactDNA System is being developed by the present inventor using mostly open-source software and tools. FIG. 10 shows an example of output of an exemplary inventive ArtifactDNA System; in particular, FIG. 10 shows an example of a custom output file generated by vulnerability scanner data ingested by an inventive ArtifactDNA System generated for every pull request. This supports implementing cybersecurity throughout development.

Through the present inventor's efforts, the U.S. Navy has developed and demonstrated ways in which an exemplary inventive ArtifactDNA System can use "best-of-breed" commercial and open-source tools to do various scans and have their (different) outputs managed consistently and aggregated into useful reports. An exemplary ArtifactDNA System enables a practitioner to determine which tools provide the best data and ingest best-of-breed scan results for various metadata from various tools. An exemplary inventive ArtifactDNA System: supports the ability to generate any report, in any format; hosts all RMF artifacts; stores complete chain of custody for all aspects of an image (developer interactions, versions, scans, etc.); collects many scan results from many tools; allow a practitioner to present these disparate sets of information (e.g., scan results) from different tools in any desired format. For instance, through inventive practice it is entirely possible to use the latest scanning tools and automation to generate EMASS RMF artifacts that the U.S. Navy already understands and is comfortable with.

Through test implementation of an experimental prototype of an inventive ArtifactDNA System, to date a U.S. Navy pipeline is automatically generating reports to supports secure development and RMF artifacts to include:
POA&M
Programmer Report
Cyber Security Scan
Dependency Vulnerability Report
ScapeGoat Scan (linting)
SonarQube (static code analysis)
Unit Testing
API Information (only for API repos)
Request for Information Similar to a Bill of Materials, a Request for Information is usually a report that is required by a NAVSEA ATO, and is a unique report having a distinctive format.

Figure 16:
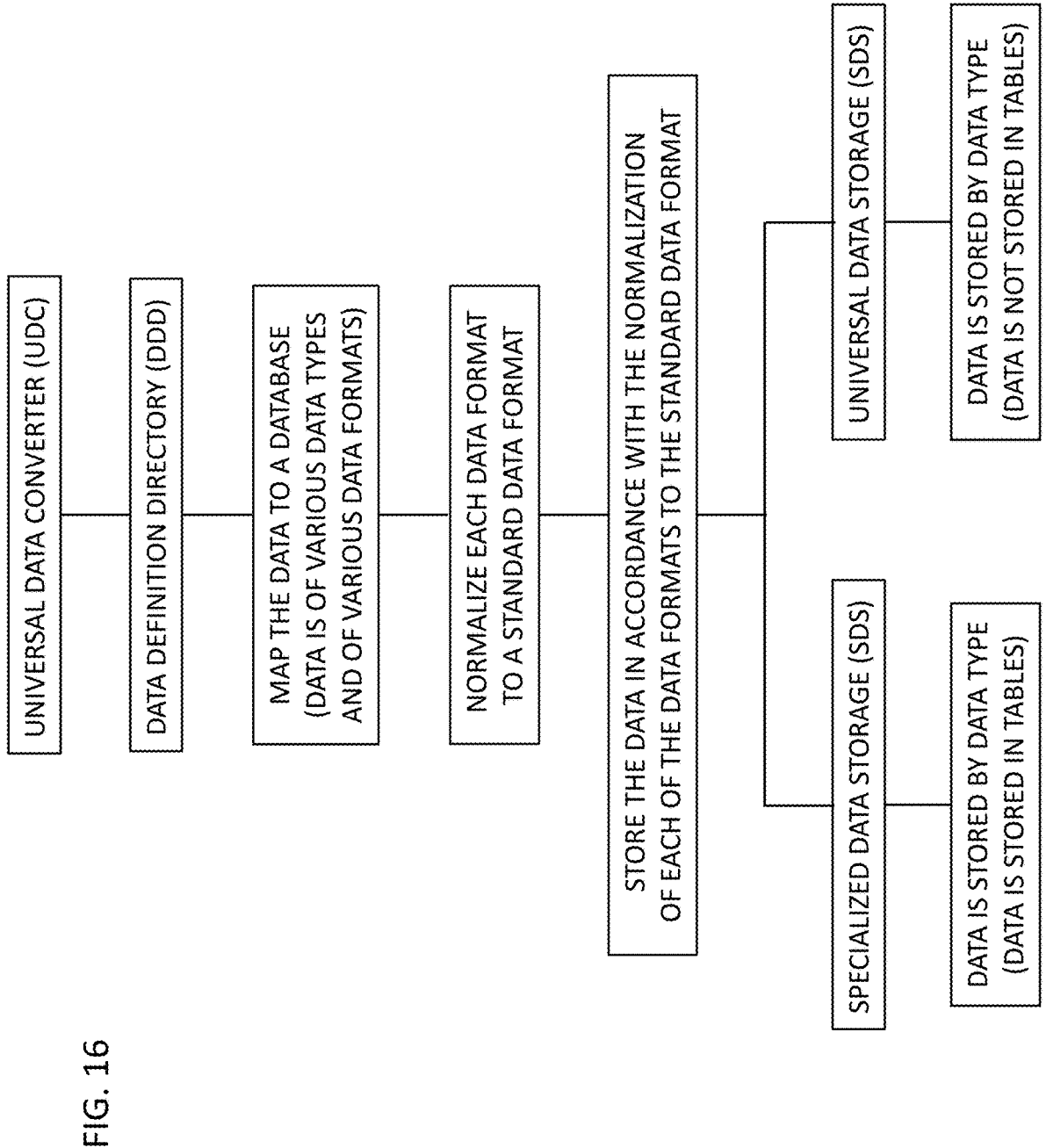
FIG. 16 is a block diagram showing data analysis and data storage in accordance with an exemplary embodiment of the present invention. Of particular note.

Now referring to FIG. 16, the Universal Data Converter (UDC) is at the heart of the present invention's ArtifactDNA System as exemplarily practiced. As exemplarily embodied, the inventive UDC is used to control data conversion, analysis, and storage within the database. The data is analyzed so as to normalize every type of data format to a standard data format, thereby permitting storage of the data in accordance with the normalization of the various data formats to the standard data format. Every data type has a data format associated therewith, and all of the individual data formats are normalized to a standard data format. With respect to each of the various formats, the information that the format itself provides is analyzed in a manner that normalizes the format to a standard format, i.e., the format that is standardized for the database. Accordingly, this allows for dynamic data types to store the corresponding format information in a normalized way. Exemplary inventive practice enables a practitioner to normalize new data types, and to do so on an ongoing or continual basis. An exemplary inventive UDC is dynamically universal, constantly ready to embrace new data types. Exemplary inventive practice can import and export to new data types, for instance import new data and export to new reports or new systems of data. The present invention, as exemplarily practiced, assimilates data in the unique sense of bringing the data into harmony both substantively (e.g., in terms of data type) and formally (e.g., structurally or formatively).

The UDC will store data using two data categories, viz., (i) specialized data storage (SDS) and (ii) universal data storage (UDS). The UDC uses the Data Definition Directory (DDD) to map the storage of all data within the system. SDS data is stored in tables designed specifically for the selected data type (Artifacts, Chain of custody, Bill of materials, Compliances, Vulnerabilities, Packages, etc.). New tables can be defined using the UDC Storage Manager or the ArtifactDNAML scripts. UDS data is stored by data type (int, float, varchar, etc.). The UDS is used when a specialized table is not desired or needed. Once all of the desired data files have been mapped into the DDD, the UDC can import, process, populate dashboards, and export data files and reports.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer-implemented method for performing data analysis, the method comprising collecting data and analyzing the collected said data, wherein said analyzing of the collected said data includes:
    characterizing, by executing software instructions using one or more computer processors, the collected said data in terms of a plurality of data types and a plurality of data formats, each said data type having a said data format associated therewith;
    normalizing, by executing software instructions using one or more computer processors, every said data format to a standard data format;
    storing, by executing software instructions using one or more computer processors, the collected said data in accordance with said normalization of every said data format to said standard data format;
    and wherein:
    said storing of the collected said data in accordance with said normalization includes using a data definition directory for effecting storage by data type;
    said storage is in a category selected from the group consisting of specialized data storage and universal data storage;
    said specialized data storage implements specialized tables, each said specialized table corresponding to a said data type;
    said universal data storage does not implement said specialized tables.

2. An apparatus comprising a computer having computer code characterized by computer program logic for performing data analysis, said computer code being executable by said computer so that, in accordance with said computer program logic, said computer performs acts including collecting data and analyzing the collected said data, wherein said analyzing of the collected said data includes:

characterizing the collected said data in terms of a plurality of data types and a plurality of data formats, each said data type having a said data format associated therewith;
normalizing every said data format to a standard data format;
storing the collected said data in accordance with said normalization of every said data format to said standard data format;
and wherein:
said storing of the collected said data in accordance with said normalization includes using a data definition directory for effecting storage by data type;
said storage is in a category selected from the group consisting of specialized data storage and universal data storage;
said specialized data storage implements specialized tables, each said specialized table corresponding to a said data type;
said universal data storage does not implement said specialized tables.

3. A computer program product for performing data analysis, the computer program product comprising a non-transitory computer-readable storage medium having computer-readable program code portions stored therein for execution by a computer, the computer-readable program code portions including:
   a first executable program code portion, for collecting data;
   a second executable program code portion, for analyzing the collected said data, wherein said second executable program code portion includes:
   a first executable program code sub-portion, for characterizing the collected said data in terms of a plurality of data types and a plurality of data formats, each said data type having a said data format associated therewith;
   a second executable program code sub-portion, for normalizing every said data format to a standard data format;
   a third executable program code sub-portion, for storing the collected said data in accordance with said normalization of every said data format to said standard data format;
   and wherein:
   said storing of the collected said data in accordance with said normalization includes using a data definition directory for effecting storage by data type;
   said storage is in a category selected from the group consisting of specialized data storage and universal data storage;
   said specialized data storage implements specialized tables, each said specialized table corresponding to a said data type;
   said universal data storage does not implement said specialized tables.

* * * * *